United States Patent
Adams

(10) Patent No.: US 6,727,962 B2
(45) Date of Patent: Apr. 27, 2004

(54) COMBINATION INSTRUMENT FOR A MOTOR VEHICLE

(75) Inventor: Jürgen Adams, Villingen-Schwenningen (DE)

(73) Assignee: Mannesmann VDO AG, Frankfurt (DE)

(*) Notice: Subject to any disclaimer, the term of this patent is extended or adjusted under 35 U.S.C. 154(b) by 173 days.

(21) Appl. No.: 09/863,076

(22) Filed: May 21, 2001

(65) Prior Publication Data
US 2002/0008808 A1 Jan. 24, 2002

(30) Foreign Application Priority Data
May 30, 2000 (DE) .......................... 100 26 892

(51) Int. Cl.⁷ .......................... G02F 1/1335
(52) U.S. Cl. .......................... 349/61; 349/68
(58) Field of Search .............. 349/61, 68, 39, 349/144, 192, 38

(56) References Cited

U.S. PATENT DOCUMENTS 5,490,005 A * 2/1996 Jueliger .................. 349/116
6,396,552 B1 * 5/2002 Brandt et al. ............ 349/63

* cited by examiner

Primary Examiner—Kenneth Parker
Assistant Examiner—David Y Chung
(74) Attorney, Agent, or Firm—Martin A. Farber

(57) ABSTRACT

In a combination instrument for a motor vehicle, in particular for a utility vehicle or a bus, having an LC display (1), a light-guiding plate (4) is provided, into which ambient light is injected from inside or from outside the motor vehicle, in which the injected ambient light is guided by total reflection at the side of the LC display (1) facing away from the viewer and which has, at the side of the LC display (1) facing away from the viewer, a coating (11) or a structure (13) for extracting the ambient light out of the light-guiding plate (4) there and for injecting the ambient light into the LC display (1). This measure backlights the LC display (1), leading to a significant increase in the contrast for information displayed on the LC display (1).

11 Claims, 2 Drawing Sheets

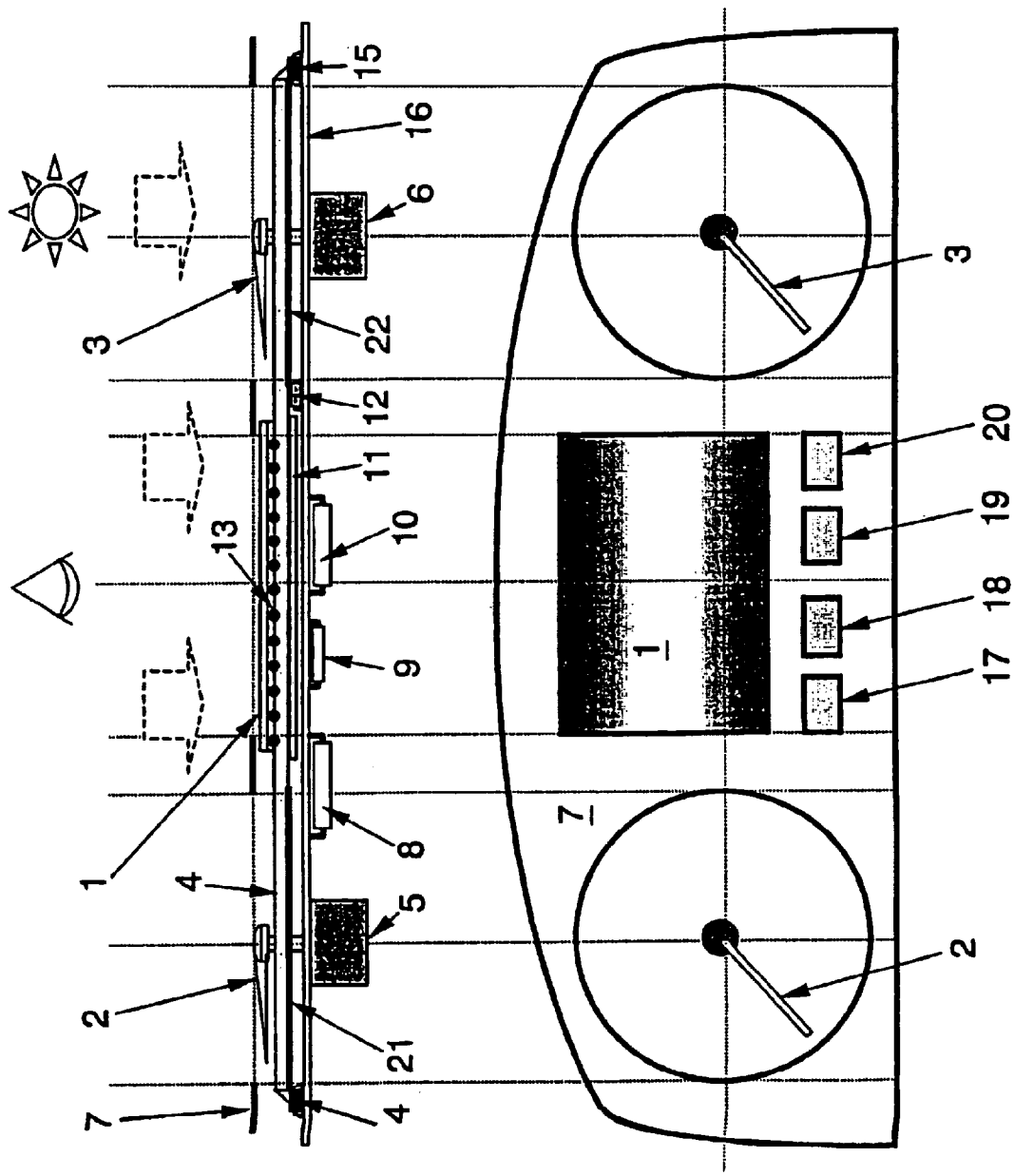

COMBINATION INSTRUMENT FOR A MOTOR VEHICLE

FIELD AND BACKGROUND OF THE INVENTION

The present invention relates to a combination instrument for a motor vehicle, in particular for a utility vehicle or a bus, having an LC display.

The design of combination instruments is known through their varied use in motor vehicles. They usually contain a plurality of display devices accommodated on a carrier plate in a single housing and inform the driver about a variety of operating states of the motor vehicle. The carrier plate is frequently embodied as an electrical printed circuit board. In addition to analog display devices, combination instruments increasingly also contain an LC display, i.e. a liquid crystal display. In a utility vehicle or in a bus the combination instrument which is usually of flat design is installed in dashboard at an inclined angle of typically 20° to 50° with respect to the horizontal, which has the advantage of permitting arrangements of instruments and electronic displays, thus also an LC display, over a large area, and thus in a particularly easily viewed way.

In contrast to the customary installation conditions of a combination instrument in a car when the combination instrument is usually installed in a virtually vertical position, the protection against glare, for example in the form of a hood which screens the combination instrument, is generally not provided in a utility vehicle or in a bus, with the result that ambient light can be incident directly onto the front of the combination instrument in a utility vehicle or in a bus. However, when that is the case, intensive light such as sunlight can adversely affect the legibility of displays on the LC display to a considerable extent. The adverse effect on the legibility of displays on the LC display results from the fact that unimpeded incidence of bright interfering light onto the LC display inevitably reduces the contrast of the representations of information on the LC display in relation to the ambient brightness.

SUMMARY OF THE INVENTION

The object of the present invention is then to disclose a combination instrument for a motor vehicle, in particular for a utility vehicle or a bus, having an LC display in which, despite the usual installation conditions for a combination instrument in a utility vehicle or in a bus and the associated interfering light influences, the legibility of information represented on the LC display is improved by increasing the contrast.

The object is achieved by means of the features of the present invention. The solution is featured by a light-guiding plate provided in the combination instrument, into which ambient light is injected from inside or from outside the motor vehicle, in which the injected ambient light is guided by means of total reflection at the side of the LC display facing away from the viewer, and which has, at the side of the LC display facing away from the viewer, a coating or a structure for extracting the ambient light out of the light-guiding plate there and for injecting the ambient light into the LC display.

Further solution features are that the LC display is of transmissive design, that the light-guiding plate is composed of plastic, that the coating of the light-guiding plate is white and highly reflective, that analog display devices with scales are also provided in the combination instrument, and that the light-guiding plate has a structure or coating which is suitable for the selective extraction of light both in the region of the scales for their divisions and/or division indications, and in the region of the display face of the LC display, that a photosensor is provided which, without being directly influenced by the ambient light, simply senses the intensity of the light present in the light-guiding plate, that, furthermore, LEDs are provided which inject their light into the light-guiding plate and that the intensity of the light emitted by the LEDs is controlled as a function of the light sensed by the photosensor, that the LEDs used in conjunction with the photosensor emit white light for a transition from daylight operation to night-time operation which is as neutrally colored as possible, that the light-guiding plate extends out of the housing of the combination instrument up to the windshield of the motor vehicle, as a result of which light which is incident into the motor vehicle through the windshield can be injected into the light-guiding plate with minimum possible obstruction, that the light-guiding plate which extends out of the housing of the combination instrument is embedded in the dashboard of the motor vehicle, and the dashboard has, in the region in front of the windshield, an opening for the injection of the ambient light into the light-guiding plate, that the light-guiding plate is provided in the region in front of the windshield with suitable structures or a coating which reduces the refractive index, said structures or coating promoting the injection of the ambient light into the light-guiding plate.

The increase in the contrast according to the invention has the advantage of obviating the need for additional active electrical light sources. A combination instrument which is equipped with the abovementioned features
a) does not have a higher electrical power demand, b) does not require a larger number of electrical components, c) does not produce any waste heat which is unavoidable with electrical light sources, and d) can be implemented in a cost-effective way because the light-guiding plate can be fabricated in virtually any desired shape as an injection-molded component. The suggested approach to a solution is based on the fact that the incidence of light which is per se an interference factor is used for backlighting the LC display. By virtue of the fact that the instant light beams are collected, guided behind the LC display and caused to emerge there in a concentrated fashion, it is possible to increase the contrast of the representations on the LC display at just the point when an increase in the contrast is most urgently required, specifically when there is intensive ambient light, for example during the day when bright sunlight is incident.

BRIEF DESCRIPTION OF THE DRAWINGS

The present invention will now be explained in more detail with reference to the 3 figures. Here,
FIG. 1 shows the front of a combination instrument of a generic type,
FIG. 2 shows the design of such a combination instrument.

DETAILED DESCRIPTION OF THE PREFERRED EMBODIMENT

Figure 3:
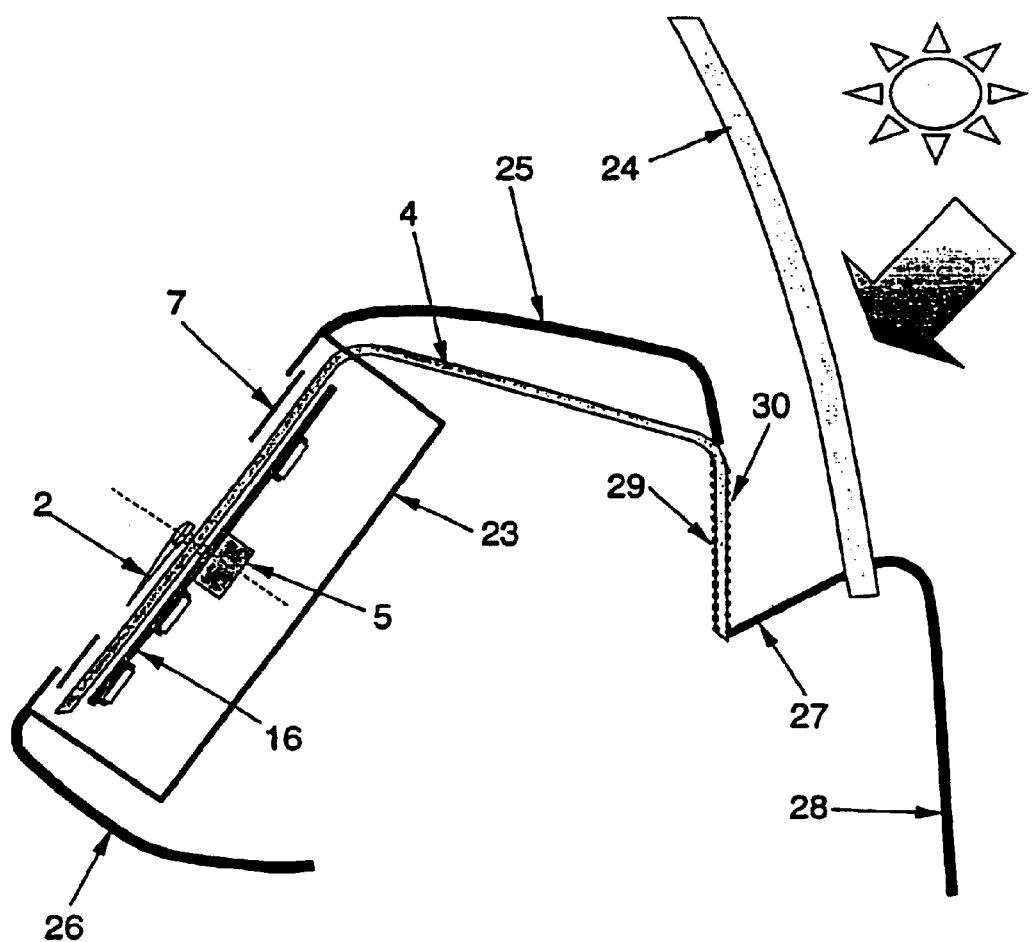
FIG. 3 shows the variant of an embodiment and arrangement of the light-guiding plate for the combination instrument proposed,
in each case shown by way of example in a view which is reduced to the essentials.

FIGS. 1 and 2 are explained here in conjunction because they show the same combination instrument. The combination instrument is illustrated with an LC display 1 and two analog display devices with the pointers 2 and 3, the axles of the pointers 2 and 3 being driven by actuator motors 5 and 6. The actuator motors 5 and 6 and a number of other electrical and electronic components 8, 9 and 10 which are required to operate the displays including the LC display 1 are preferably mounted on the side of an electrical printed circuit board 16 facing away from the viewer. The flat-layered design of the combination instrument has, on the side of the printed circuit board 16 facing the viewer, a light-guiding plate 4 which is itself in turn covered by an opaque mask 7 in the combination instrument design shown. In the example illustrated, the light-guiding plate 4 and the mask 7 extend over the entire front of the combination instrument. The light-guiding plate 4 which is particularly large in area can be fabricated, for example, as an injection molded component made of a preferably transparent plastic and can have a thickness of approximately 3 mm. The mask 7 which also serves for aesthetic purposes can form an instrument surface of the combination instrument on the viewer side if further transparent cover (not illustrated here) is not provided for the front of the combination instrument. The LC display 1, which is of preferably transmissive design, is arranged here in the center between the two analog display devices and between the light-guiding plate 4 and the mask 7. In order to inject light into the light-guiding plate 4, the mask 7 has an opening in the region of the analog display devices or is at least translucent there so that particularly in this region ambient light being incident on the light-guiding plate 4 in as extensive and unobstructed a way as possible. Of course, the mask 7 also has an opening in the region of the display face of the LC display 1 or is transparent so that the LC display 1 is not obstructed there. The light-guiding plate 4 extends under the region of the display face of the LC display 1 preferably over the entire surface and is provided in this region with a structure 13 for extracting the light guided in the light-guiding plate 4, said structure 13 being applied or provided on the upper side of the light-guiding plate 4. The light which is injected into the light-guiding plate 4 in the region of the analog display devices is guided by means of total reflection of the boundaries of the light-guiding plate 4 to the region of the display face of the LC display 1. The extraction of the light out of the light-guiding plate 4 and the concentrated injection of the light guided in the light-guiding plate 4 into the LC display 1, said injection being distributed as uniformly as possible over the region of the display face of the LC display 1, is promoted in the region of the display face of the LC display 1 by means of the white, highly reflective coating 11 which is applied or provided there on the underside of the light-guiding plate 4. This coating 11, which can also be referred to as conditioning of the light-guiding plate 4 carried out at the aforesaid location, acts, on the one hand, as a mirror for the light which is incident directly into the LC display 1 from the front, and furthermore, said coating 11 also promotes, in conjunction with the structure 13 which largely spatially covers it, the extraction of the light guided by the light-guiding plate 4, both bringing about backlighting of the LC display 1. In daylight, a contrast ratio of approximately 5:1 can be achieved in this way for the representation of information on the display face of the LC display 1 without the aid of active electrical light sources.

Scales 21 and 22 are preferably provided on the underside of the light-guiding plate 4 in the region of the analog display devices. These scales 21 and 22 can be implemented, for example, by means of a printed film or by printing on the light-guiding plate 4. There may also be provision for the light-guiding plate 4 to be conditioned both in the region of the scales 21 and 22 for their divisions and/or division information and in the region of the display face of the LC display 1 or to have there a structure and coating which is suitable for the extraction of light. The axles of the pointers 2 and 3 of the analog display devices penetrate, coming from the actuating motors 5 and 6, the light-guiding plate 4 with the result that the pointer deflection takes place above the light-guiding plate 4. The pointers 2 and 3 can be illuminated by extracting light from the light-guiding plate 4 concentrically in the vicinity of the pointer axles, it being possible for the light from the light-guiding plate 4 to be guided into the pointer axles using prism structures which are known per se and are not illustrated in FIGS. 1 and 2.

FIG. 1 also shows monitoring lights 17, 18, 19 and 20 which are usually associated with a combination instrument and which can be implemented using conventional technology and located in corresponding recesses of the light-guiding plate 4, it being possible to provide screening light shafts for these monitoring lights 17, 18, 19 and 20 in order to avoid undesired extraction of light in the direction of the light-guiding plate 4. Moreover, in FIG. 2 the light source for the light which is incident on the front of the combination instrument, the light beam directed onto the combination instrument and the viewer are illustrated by means of symbols. Thin auxiliary lines which are illustrated in a dotted form in and between FIGS. 1 and 2 are intended to facilitate the assignment of components and comprehension of their arrangement.

In FIG. 2, measures are also indicated which permit the proposed combination instrument to operate in twilight and in particular during the night if therefore the ambient light which can be collected by the light-guiding plate 4 is no longer sufficient in itself for appropriate backlighting of the LC display 1 and thus for increasing the contrast for the information illustrated on it. In the spatial vicinity of the coating 11, that is to say the point at which the light guided in the light-guiding plate 4 is transmitted into the LC display 1, a photosensor 12 is preferably arranged on the light-guiding plate 16. This photosensor 12, which may be composed of a light-dependent resistor (LDR), is used in conjunction with a suitable control device implemented, for example, in the components 8, 9 or 10, to control LEDs 4 and 15 which are also preferably arranged on the printed circuit board 16 and which inject their light, for example by means of suitable prism arrangements—as indicated in FIG. 2 at the two ends of the light-guiding plate 4—into the light-guiding plate 4 where necessary, for example particularly during twilight or at night. In contrast to customary illumination controllers for conventional combination instruments, which use a photosensor to sense the ambient light directly, the arrangement proposed here for the photosensor 12 has the advantage that the entirety of the light picked up by the light-guiding plate 4 is evaluated in order to control the illumination. Commercially available photosensors generally have a narrow sensing angle and owing to their sensing of light which is more or less only point sensing, can be confused, under certain circumstances, by a single light source present in the cab of the vehicle, leading to the LC display 1 being illuminated in a way which is less than optimal. On the other hand, because the light-guiding plate 4 picks up the ambient light over a relatively large surface, scattered light originating, for example, also from bright, reflective internal devices and paneling components of the cab of the vehicle or from the driver's clothing is also sensed. Owing to the arrangement proposed here for the photosensor 12, the latter picks up the intensity of the light collected by the light-guiding plate 4, as a result of which the LC display 1 can be illuminated in a more suitable way. For this reason, this arrangement is suitable, despite the use of just one commercially available photosensor 12, for sensing an average value of the light conditions present in front of the combination instrument. Both the light which is injected into the light-guiding plate 4 by the LEDs 4 and 15 and the ambient light which is collected by the light-guiding plate 4 in the region of the display face of the LC display 1 is extracted by means of the light-guiding plate 4 conditioned at this point or the structure 13 there in conjunction with the coating 11 there on the underside of the light-guiding plate 4 for the purpose of backlighting the LC display 1. The same applies if the scales, their divisions or division indications are also to be illuminated in this way. It is recommended to use LEDs 4 and 15 which emit white light for a neutrally colored transition from daylight operation to night time operation, with the result that during twilight or in the case of light conditions with fluctuating intensity a sudden color change for the backlighting of the LC display 1 is avoided, which could otherwise possibly distract the driver. If desired, further appropriately colored LEDs, which add their light as required but which are activated independently of the photosensor 12 may be provided for color representations, for example in the region of the scales 21 and 22 or of the pointers 2 and 3.

A further embodiment of the invention is shown in FIG. 3. In the example shown there, the light-guiding plate 4 extends out of the housing 23 of the combination instrument to the windshield 24 of the motor vehicle in order to inject light which is incident into the motor vehicle through the windshield 24 into the light-guiding plate 4 with minimum obstruction. The combination instrument is mounted in the dashboard, and the dashboard itself is mounted in the cab of the motor vehicle, which is indicated in FIG. 3 by the boundary lines 25, 26, 27 and 28. According to this embodiment of the invention, the light-guiding plate 4 is laid in the dashboard as a light-guiding system. The dashboard has, in the region in front of the windshield 24 an opening in order to expose the light-guiding plate 4 which is embedded into the dashboard. In order to collect as much light as possible in the light-guiding plate 4, the latter is constructed with a large area on the inside of the vehicle in front of the windshield 24 and can extend, for example, over the entire width of the dashboard or at least over the width of the combination instrument. The injection of the ambient light into the light-guiding plate 4 can be promoted by means of suitable structures 29 which are mounted in the region in front of the windshield 24, or a coating 30 which reduces the refractive index. The guiding of light in the light-guiding plate 4 is in turn effected by means of total reflection, with the result that the injected light is guided as far as the LC display 1 in the combination instrument and is then extracted there in the way already described in order to backlight the LC display 1. In this exemplary embodiment of the invention, it is to be noted that the measures taken in the region in front of the windshield 24 in order to inject light do not lead to undesired reflections in the windshield 24. In order to facilitate mounting of the light-guiding plate 4 which leads out of the combination instrument, the light-guiding plate 4 may be of multi-component design. In the sectional view of the combination instrument shown in FIG. 3, reference is made, as previously in FIGS. 1 and 2, to an analog display device with a pointer 2, the actuating motor 5 which drives the axle of the pointer 2, a mask 7 which covers the front of the combination instrument and the printed circuit board 16 together with a number of components mounted thereon.

What is claimed is:

1. Combination instrument for a motor vehicle having an LC display (1), wherein a light-guiding plate (4) is provided, into said light-guiding plate (4) ambient light is injected from inside or from outside the motor vehicle, in said light-guiding plate (4) the injected ambient light is guided by total reflection at a side of the LC display (1) facing away from a viewer, and said light-guiding plate (4) at the side of the LC display (1) facing away from the viewer has a coating (11) or a structure (13) for extracting the ambient light out of the light-guiding plate (4) and for injecting the ambient light into the LC display (1); and wherein the light-guiding plate (4) extends out of a housing (23) of the combination instrument to a windshield (24) of the motor vehicle in order to inject into the light-guiding plate (4) the light which is incident into the motor vehicle through the windshield (24).

2. The combination instrument according to claim 1, wherein the LC display (1) is transmissive.

3. The combination instrument according to claim 1, wherein the light-guiding plate (4) is composed of plastic.

4. Combination instrument for a motor vehicle having an LC display (1), wherein a light-guiding plate (4) is provided, into said light-guiding plate (4) ambient light is injected from inside or from outside the motor vehicle, in said light-guiding plate (4) the injected ambient light is guided by total reflection at a side of the LC display (1) facing away from a viewer, and said light-guiding plate (4) at the side of the LC display (1) facing away from the viewer has a coating (11) or a structure (13) for extracting the ambient light out of the light-guiding plate (4) and for injecting the ambient light into the LC display (1); and wherein the coating (11) of the light-guiding plate (4) is white and highly reflective.

5. Combination instrument for a motor vehicle having an LC display (1), wherein a light-guiding plate (4) is provided, into said light-guiding plate (4) ambient light is injected from inside or from outside the motor vehicle, in said light-guiding plate (4) the injected ambient light is guided by total reflection at a side of the LC display (1) facing away from a viewer, and said light-guiding plate (4) at the side of the LC display (1) facing away from the viewer has a coating (11) or a structure (13) for extracting the ambient light out of the light-guiding plate (4) and for injecting the ambient light into the LC display (1); and wherein analog display devices with scales (21, 22) are provided, and the light-guiding plate (4) has the structure (13) or the coating (11) which is suitable for selective extraction of light both in a region of the scales (21, 22) for divisions or division indications of the scales, and in a region of a display face of the LC display (1).

6. The combination instrument according to claim 1, wherein a photosensor (12) is provided to sense intensity of the light present in the light-guiding plate (4) without being directly influenced by the ambient light, LEDs (4, 15) are provided to inject light into the light-guiding plate (4), and the intensity of the light emitted by the LEDs (4, 15) is controlled as a function of the light sensed by the photosensor (12).

7. Combination instrument for a motor vehicle having an LC display (1), wherein a light-guiding plate (4) is provided, into said light-guiding plate (4) ambient light is injected from inside or from outside the motor vehicle, in said light-guiding plate (4) the injected ambient light is guided by total reflection at a side of the LC display (1) facing away from a viewer, and said light-guiding plate (4) at the side of the LC display (1) facing away from the viewer has a coating (11) or a structure (13) for extracting the ambient light out of the light-guiding plate (4) and for injecting the ambient light into the LC display (1); wherein a photosensor (12) is provided to sense intensity of the light present in the light-guiding plate (4) without being directly influenced by the ambient light, LEDs (4, 15) are provided to inject light into the light-guiding plate (4), and the intensity of the light emitted by the LEDs (4, 15) is controlled as a function of the light sensed by the photosensor (12); and wherein the LEDs (4, 15) emit white light for a neutrally colored transition from daylight operation to night-time operation.

8. The combination instrument according to claim 1, wherein the light-guiding plate (4) extending out of the housing (23) of the combination instrument is embedded in a dashboard of the motor vehicle, and the dashboard in a region in front of the windshield (24) has an opening for the injection of the ambient light into the light-guiding plate (4).

9. Combination instrument for a motor vehicle having an LC display (1), wherein a light-guiding plate (4) is provided, into said light-guiding plate (4) ambient light is injected from inside or from outside the motor vehicle, in said light-guiding plate (4) the injected ambient light is guided by total reflection at a side of the LC display (1) facing away from a viewer, and said light-guiding plate (4) at the side of the LC display (1) facing away from the viewer has a coating (11) or a structure (13) for extracting the ambient light out of the light-guiding plate (4) and far infecting the ambient light into the LC display (1); wherein a photosensor (12) is provided to sense intensity of the light present in the light-guiding plate (4) without being directly influenced by the ambient light, LEDs (4, 15) are provided to inject light into the light-guiding plate (4), and the intensity of the light emitted by the LEDs (4, 15) is controlled as a function of the light sensed by the photosensor (12); wherein the LEDs (4, 15) emit white light for a neutrally colored transition from daylight operation to night-time operation; and wherein the light-guiding plate (4) is provided in the region in front of a windshield (24) of the vehicle with structures (29) or a coating (30) which reduces a refractive index, said structures (29) or said coating (30) promoting the injection of the ambient light into the light-guiding plate (4).

10. The combination instrument according to claim 1, wherein the light-guiding plate (4) is provided in the region in front of the windshield (24) with structures (29) or a coating (30) which reduces a refractive index, said structures (29) or said coating (30) promoting the injection of the ambient light into the light-guiding plate (4).

11. The combination instrument according to claim 1, wherein the motor vehicle is a utility vehicle or a bus.

* * * * *